(12) United States Patent
Pokornowski et al.

(10) Patent No.: US 10,373,634 B2
(45) Date of Patent: Aug. 6, 2019

(54) CO-LOCATED GIMBAL-BASED DUAL STAGE ACTUATION DISK DRIVE HEAD SUSPENSION WITH NON-PARALLEL MOTORS

(71) Applicant: Hutchinson Technology Incorporated, Hutchinson, MN (US)

(72) Inventors: Zachary A. Pokornowski, Cokato, MN (US); Ryan N. Ruzicka, Waconia, MN (US); Jacob D. Bjorstrom, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/638,305

(22) Filed: Jun. 29, 2017

(65) Prior Publication Data
US 2018/0005653 A1 Jan. 4, 2018

Related U.S. Application Data (60) Provisional application No. 62/356,704, filed on Jun. 30, 2016.

(51) Int. Cl.
*G11B 5/58* (2006.01)
*G11B 5/48* (2006.01)
*G11B 5/55* (2006.01)

(52) U.S. Cl.
CPC .............. *G11B 5/483* (2015.09); *G11B 5/486* (2013.01); *G11B 5/4833* (2013.01);
(Continued)

(58) Field of Classification Search
None
See application file for complete search history.

(56) References Cited

U.S. PATENT DOCUMENTS

| 5,781,379 A | * | 7/1998 | Erpelding et al. | ..... G11B 5/486 360/245.3 |
| 5,812,344 A | * | 9/1998 | Balakrishnan | ......... G11B 5/486 360/244.3 |

(Continued)

FOREIGN PATENT DOCUMENTS

WO 2013/138619 A1 9/2013

OTHER PUBLICATIONS

International Search Report and Written Opinion in International Application No. PCT/US2017/040350, dated Oct. 25, 2017.

*Primary Examiner* — Craig A. Renner
(74) *Attorney, Agent, or Firm* — Nixon Peabody LLP (57) ABSTRACT

Embodiments of disk drive head suspensions are described that include a spring metal layer. The spring metal layer includes a base region, support arms extending from the base region, and a slider mounting region. The slider mounting region includes a proximal portion, a distal portion, and a pair of motor openings. The motor openings are configured to receive motors such that the longitudinal axes of the motors are non-parallel with the longitudinal axis of the slider mounting region. The suspensions include traces that include a base portion on the base region of the spring metal layer, a spring metal-unsupported portion extending from the base region to the slider mounting region, and a slider mounting portion extending from the spring metal-unsupported portion onto the slider mounting region. And, the suspensions include an insulating layer between portions of the spring metal layer and the conductor layer.

26 Claims, 12 Drawing Sheets

(52) U.S. Cl.
CPC .......... *G11B 5/4853* (2013.01); *G11B 5/4873* (2013.01); *G11B 5/5552* (2013.01)

(56) References Cited

U.S. PATENT DOCUMENTS

| | | |
|---|---|---|
| 8,085,508 B2 | 12/2011 | Hatch |
| 8,780,503 B2 | 7/2014 | Wright et al. |
| 8,982,513 B1 | 3/2015 | Tian et al. |
| 9,042,054 B2 | 5/2015 | Bjorstrom et al. |
| 9,111,559 B1 | 8/2015 | Hahn et al. |
| 9,147,412 B2 | 9/2015 | Okuno et al. |
| 9,792,936 B1 * | 10/2017 | Kumar et al. ......... G11B 5/483 |
| 2014/0098440 A1 | 4/2014 | Miller et al. |
| 2014/0139953 A1 | 5/2014 | Hatch |
| 2014/0198412 A1 | 7/2014 | Miller et al. |
| 2014/0362476 A1 | 12/2014 | Miller et al. |
| 2015/0055256 A1 | 2/2015 | Miller |
| 2015/0062758 A1 | 3/2015 | Miller et al. |
| 2015/0187376 A1 | 7/2015 | Miller et al. |
| 2015/0187377 A1 | 7/2015 | Fujimura |

* cited by examiner

FIG. 5B

CO-LOCATED GIMBAL-BASED DUAL STAGE ACTUATION DISK DRIVE HEAD SUSPENSION WITH NON-PARALLEL MOTORS

CROSS-REFERENCE TO RELATED APPLICATIONS

This application claims the benefit of U.S. Provisional Application No. 62/356,704 filed on Jun. 30, 2016, which is hereby incorporated by reference in its entirety.

FIELD

Embodiments of the invention relate generally to disk drive head suspensions and flexures.

BACKGROUND

Co-located gimbal-based dual stage actuation (DSA) suspensions are generally known and disclosed, for example, in the following U.S. patents and Published patent applications, all of which are incorporated herein by reference in their entirety and for all purposes.

| Inventor Name | Pat. No./Patent Application No. |
|---|---|
| Hahn et al. | 9,111,559 |
| Hatch | 2009/0244786 |
| Hatch | 2014/0139953 |
| Wright et al. | 2014/0104722 |
| Miller et al. | 2014/0198412 |
| Miller et al. | 2014/0362476 |
| Bjorstrom et al. | 2015/0055254 |
| Miller | 2015/0055256 |
| Miller et al. | 2015/0062758 |
| Okuno et al. | 2015/0179196 |
| Miller et al. | 2015/0187376 |
| Fuj imura | 2015/0187377 |

There remains a continuing need for improved DSA suspensions. DSA suspensions with enhanced performance capabilities are desired. The suspensions should be capable of being efficiently manufactured.

SUMMARY

Embodiments of disk drive head suspensions are described that include a spring metal layer. The spring metal layer includes a base region, support arms extending from the base region, and a slider mounting region. The slider mounting region includes a proximal portion, a distal portion, and a pair of motor openings. The motor openings are configured to receive motors such that the longitudinal axes of the motors are non-parallel with the longitudinal axis of the slider mounting region. The suspensions include traces that include a base portion on the base region of the spring metal layer, a spring metal-unsupported portion extending from the base region to the slider mounting region, and a slider mounting portion extending from the spring metal-unsupported portion onto the slider mounting region. And, the suspensions include an insulating layer between portions of the spring metal layer and the conductor layer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 6 A and 6B are load beam-side and flexure side isometric views, respectively, of a tri-stage actuation disk drive head suspension with non-parallel motors according to an embodiment.

DETAILED DESCRIPTION

Disk drive head suspensions with non-parallel motors including load beams and flexures according to embodiments are illustrated in the attached drawing figures and described herein. Embodiments include one or more of the following features: a power trace and terminal can be at the distal motor end and the ground trace and terminal can be at the proximal motor end to enable conductive contact of the motor terminals to the stainless steel layer structures (e.g., by conductive adhesive); adhesive used to mount the motors to the flexure that wicks or spreads to the polyimide backing of the traces (e.g., near the proximal side of the motor) can provide a constraining effect on the traces and enhance performance characteristics (e.g., yaw frequency); relatively large strategic hole(s) in the load beam on the sides of the dimple enable anytime motor (e.g., PZT motor) placement; angled motors (e.g., five-forty degrees) enable optimization of footprint capabilities, adhesive bonding and trace routing and open to design flexibility; motors on the forward and distal sides of the load point location (e.g., location of dimple); motors on the load beam side of the slider with holes in the load beam for full motor pass through for assembly and operation clearance; motors are within the slider footprint; static center of rotation is relatively close to the load point location; traces are routed through the center of the slider area for mass/inertia balance; and angled motors bring the center of rotation closer to the dimple. Advantages of embodiments include one or more of the following: increased motor robustness—not cantilevered and within a load beam pocket—enables increased handling and shock robustness and can mitigate issues with motor cracking; inertia balance for sway without adding additional mass since motor rotation can be directly around the load point and balanced on both sides of the load point; the portion of the motors forward of the load point provide mass balancing and are within the slider footprint on the load beam side of the flexure to enhance performance (e.g., increase yaw frequency); the compact design can reduce rotational inertia; enhances limiter usage because of the motor location relative to the dimple; need not use a ring gimbal; the load beam holes enable clearance flexibility for various motor thicknesses and anytime motor attach; allows for multiple options for the flexure to motor interface (e.g., conductive, nonconductive, viscoelastic, low modulus adhesives, mechanical interference for damping); relatively linear trace portions enhance performance such as yaw; and can enable use of reduced thickness stainless steel.

Figure 1A:
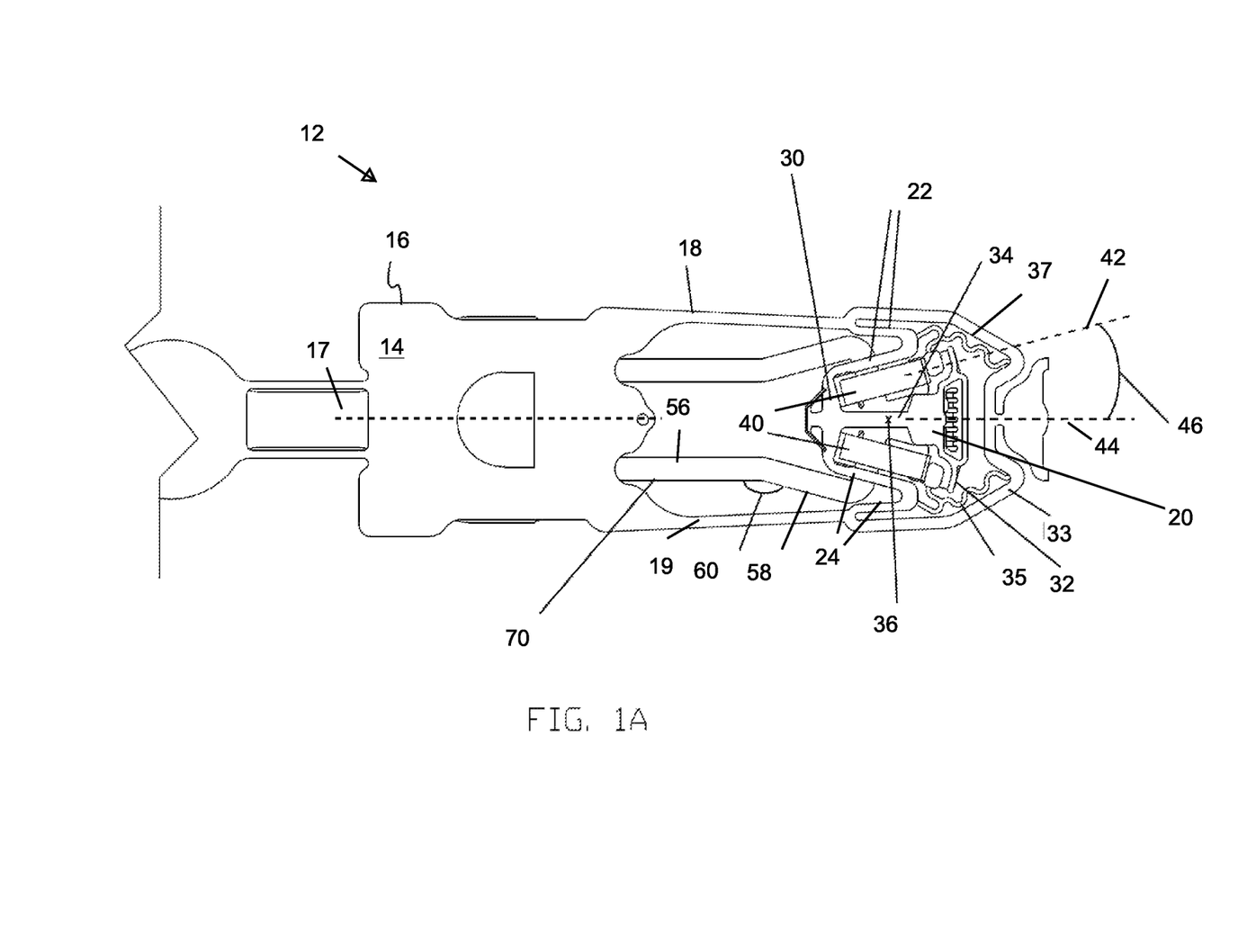
FIGS. 1A and 1B are stainless steel-side and trace-side plan views, respectively, of an integrated lead, co-located dual stage actuation ("DSA") disk drive head suspension flexure in accordance with embodiments of the invention, including the piezoelectric ("PZT") motors.

FIG. 1A illustrates a stainless steel-side trace-side plan view of an integrated lead, co-located dual stage actuation ("DSA") disk drive head suspension flexure according to an embodiment including the piezoelectric ("PZT") motors. The flexure 12 includes a spring metal layer 14 that forms the main structure support of the flexure 12. For various embodiments, a spring metal layer 14 may be formed from one or more metals including, but not limited to, stainless steel. The spring metal layer 14 includes a base region 16 which can be attached (e.g., by welding) to a load beam. The base region 16 having a central longitudinal flexure axis 17. The spring metal layer 14 further includes a pair of support arms 18, 19; a slider mounting region 20; and linkage members 22, 24. The support arms 18, 19 are laterally spaced and extend distally from the base region 16. The slider mounting region 20 has a slider mounting longitudinal axis 44. For various embodiments, the slider mounting longitudinal axis 44 of the slider mounting region 20 is parallel with the central longitudinal flexure axis 17. The slider mounting region 20 includes a proximal portion 30, a distal portion 32, and a middle portion 34. The middle portion 34 of the slider mounting region 20 is located between the proximal portion 30 and the distal portion 32. For various embodiments, the slider mounting region 20 includes a load point location 36 on the middle portion 34. The spring metal layer 14 further includes an end portion 33 coupled to the support arms 18, 19. According to some embodiments, the end portion 33 is configured to extend distally around the slider mounting region 20.

The slider mounting region 20 defines a pair of laterally spaced motor openings 80, 82 between the proximal portion 30 and the distal portion 32 defined by edges in the spring metal layer 16. For various embodiments, each motor opening 80, 82 is arranged on a side of the load point location 36 opposite from the other. Further, the motor openings 80, 82 are configured to receive flexure motors 40, such that a longitudinal axis of each of the flexure motors 40 are non-parallel with the longitudinal axis of the slider mounting region 30.

The flexure motors 40, according to various embodiments, are each a piezoelectric element that articulates when a voltage is applied across the element to provide microactuations. Each motor 40 can contain an anode terminal on a first major side of the flexure motor 40 and a cathode terminal on the opposite major side of the flexure motor 40. A first electrical connection can be made between a trace of conductor layer 50 to the anode or cathode terminal of the flexure motor 40 and a second electrical connection can be made between the spring metal layer 14 (e.g., as ground) and the other of the anode or cathode terminal of the flexure motor 40.

For various embodiments, an angle 46 between the longitudinal axis 44 of the slider mounting region 20 and the longitudinal axis 42 of each of the flexure motors 40 is in a range including five to forty degrees. The linkage members 22, 24 couple the proximal portion 30 of the slider mounting region 20 to the support arms 18. According to some embodiments, a distance between a distal end of a flexure motor 40 coupled to the distal portion 32 of the slider mounting region 20 is greater than a distance between proximal end of a flexure motor 40 coupled to the proximal portions 30 of the slider mounting region 20. Further, at least twenty-five percent of a length of a flexure motor 40 is located proximally and distally of the load point location 36 for some embodiments.

Figure 1B:
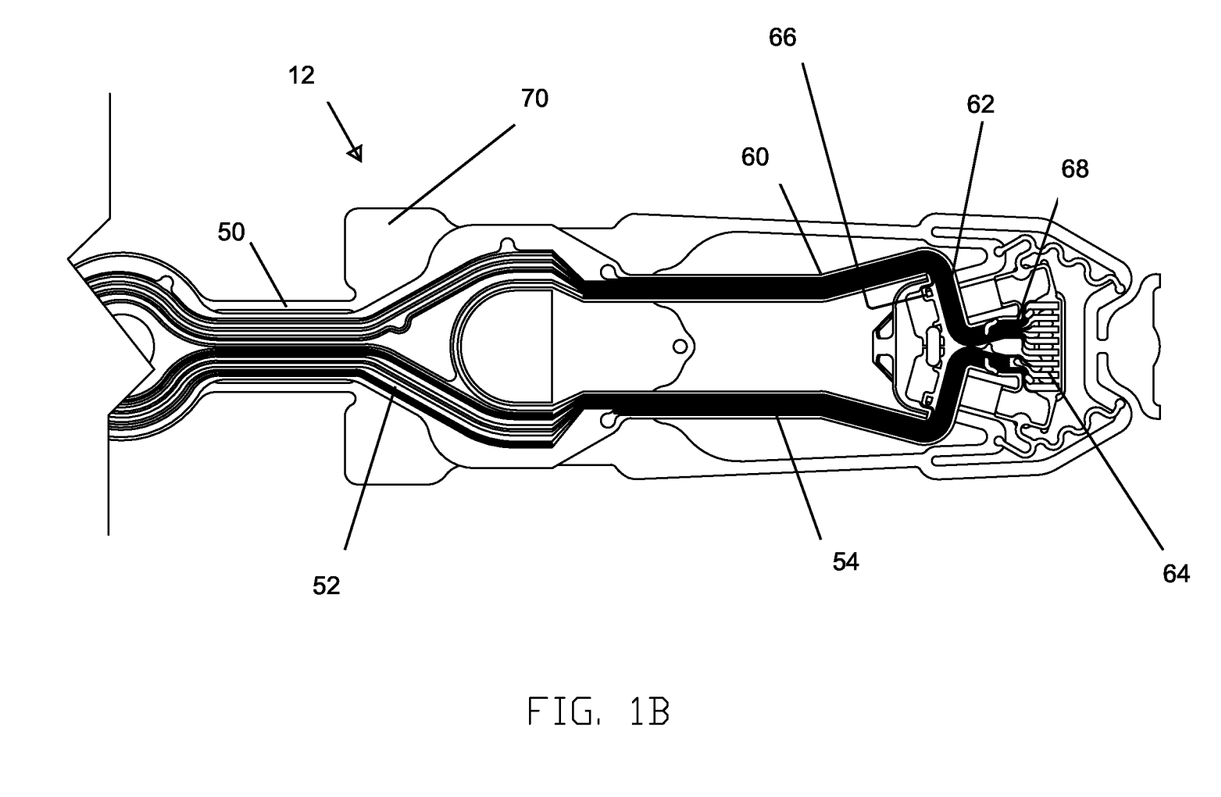

FIG. 1B illustrates a trace-side plan view of an integrated lead, co-located dual stage actuation ("DSA") disk drive head suspension flexure according to an embodiment including the piezoelectric ("PZT") motors. According to some embodiments, a conductor (e.g., copper or copper alloy) layer 50 of flexure 12 includes one or more groups of traces. For an embodiment including two group of traces, each group of traces is arranged such that each group is on an opposite side of the central longitudinal flexure axis 17. Each group of traces, according to some embodiments, includes a base portion 52 on the base region 16 of the spring metal layer 14, a spring metal-unsupported portion 54 extending from the base region 16 of the spring metal layer 14 to the slider mounting region 20. For some embodiments, the spring metal-unsupported portion 54 includes linear portions 56 and a non-linear portions 58 that define an interior angle 60. According to various embodiments, interior angle 60 is configured to be in a range including one-hundred and thirty five degrees to one-hundred and sixty degrees. For other embodiments, the interior angle 60 is greater than one-hundred and sixty degrees.

According to some embodiments, a group of traces includes a slider mounting portion 62 extending from the spring metal-unsupported portion 54 onto the slider mounting region 20. According to various embodiments, the traces of the slider mounting portion 62 are configured to have at an angle in a range including eighty degrees to one-hundred degrees with respect to a longitudinal axis 42 of a motor 40 or a motor opening. For a specific embodiment, the slider mounting portion 62 are configured to have an angle of ninety degrees with respect to a longitudinal axis 42 of the motor 40 or motors openings. One or more of the traces in a group of traces on the slider mounting region 20 extend onto the middle portion 34 of the slider mounting region 20 according to some embodiments. For example, the one or more of traces on the slider mounting region 20 include a trace 66 that terminates at a terminal pad 64 on the slider mounting region 20. The one or more of traces, for example, include a trace 68 on the slider mounting region 20 that terminates at a terminal pad on the distal portion of the slider mounting region 20. The one or more traces may include at least a motor power trace that terminates at a terminal pad configured to be coupled to the motor at the distal portion of the slider mounting region and at least one of the traces is a ground trace that terminates at a terminal pad configured to be coupled to the motor at the proximal portion of the slider mounting region.

The flexure 12 also includes an insulating layer 70 between portions of the spring metal layer 14 and the conductor layer 50. The insulating layer 70, according to some embodiments, is a polyimide layer. According to some embodiments, an insulating layer 70 is on at least portions of the spring metal-unsupported portions 54 of the conductor layer 50.

For some embodiments, the flexure 12 includes one or more polymer tethers extending from an end portion 33 to the linkage members 22, 24. The tethers are configured to act as shock limiters to provide enhance performance of the suspension. The tethers, according to some embodiments, are configured to act as non-operational shock limiters. According to various embodiments, the tethers are arranged and configured to attenuate one or more resonance modes of a disk drive suspension.

The one or more polymer tethers 35, 37, according to some embodiments, are formed from polyimide or other insulating materials including those known in the art. The one or more polymer tethers 35, 37 are configured to extend from the end portion 33 to the motor islands 84, 86 according to some embodiments. The polymer tethers 35, 37 are serpentine in shape for various embodiments. The one or more polymer tethers 35, 37 are formed, for various embodiments, as part of a cover coat layer of polymer.

Figure 2A:
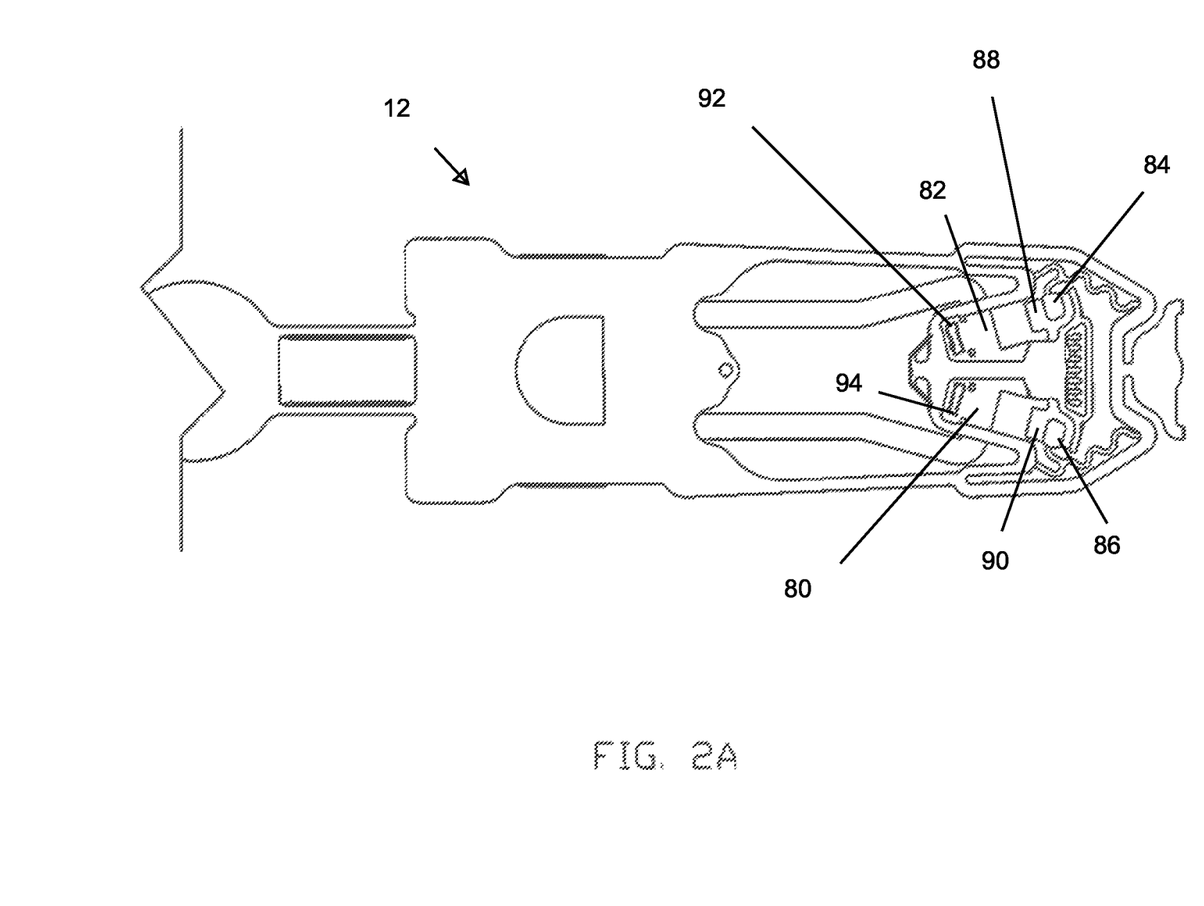
FIGS. 2A and 2B are stainless steel-side and trace-side plan views, respectively, of the DSA flexure shown in FIGS. 1A and 1B, without the piezoelectric motors.
Figure 2B:
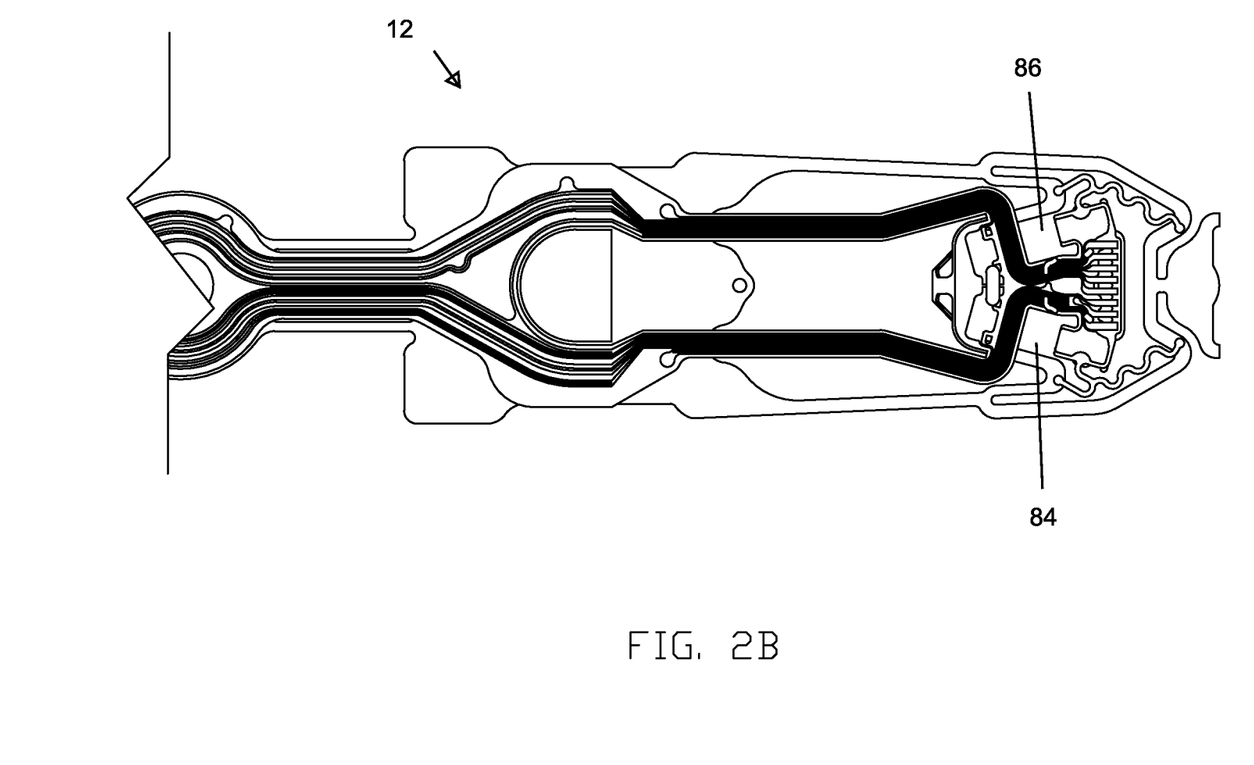

FIGS. 2A and 2B are stainless steel-side and trace-side plan views, respectively, of the DSA flexure shown in FIGS. 1A and 1B, without the piezoelectric motors. The flexure 12, according to some embodiments, includes a spring metal layer 14 includes a motor island 84, 86 in each motor opening 80, 82. According to various embodiments, a first motor trace, such as a power trace, terminates at a first terminal pad 88, 90 on each motor island and a second motor trace, such as a ground trace, terminates at a second terminal pad 92, 94. For other embodiments, a power trace terminates at the second terminal pad 92, 94 and the ground trace terminates at a first terminal pad 88, 90. The first terminal pad 88, 90 is configured to have a flexure motor 40 coupled with the first terminal pad using techniques including, but not limited to, conductive adhesive, solder, and those known in the art to mechanically and electrically couple a flexure motor 40 to a terminal pad. For some embodiments, the motor islands 84, 86 and the first terminal pads 88, 90 are adjacent to the distal portion 32 of the slider mounting region 20.

Figure 3A:
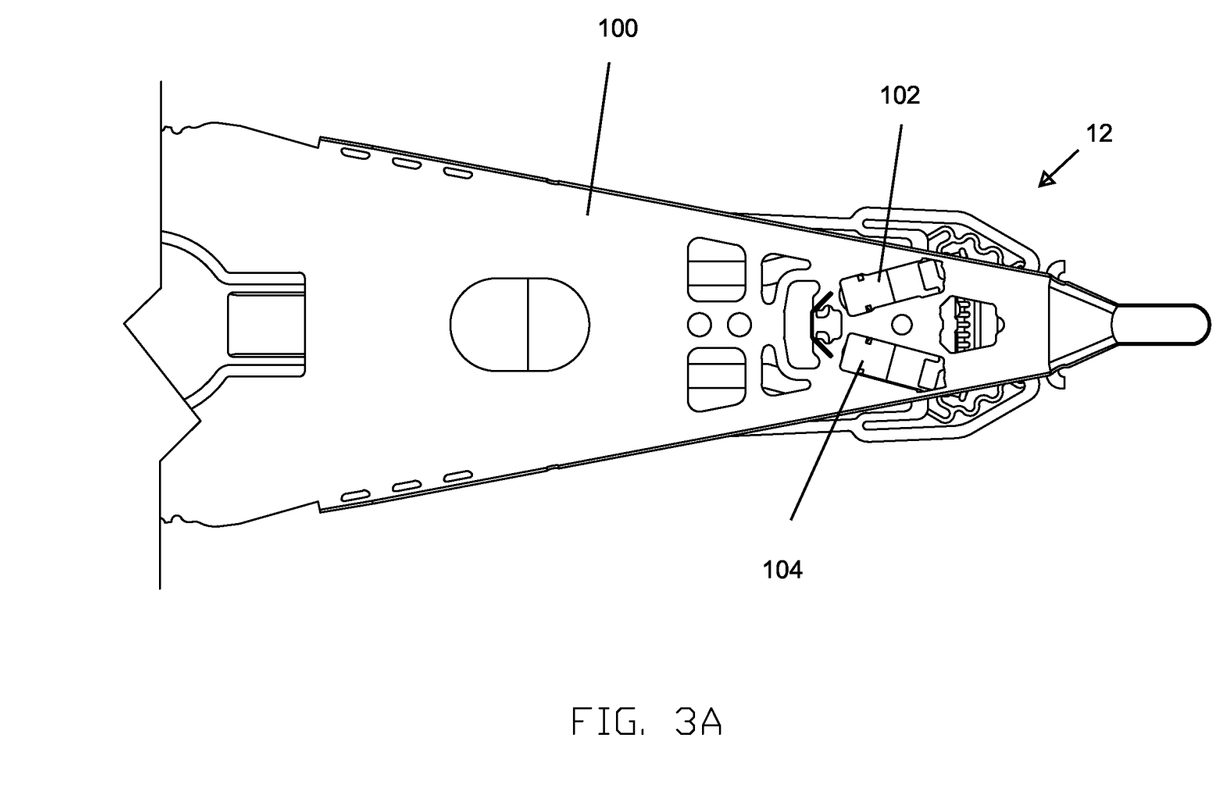
FIGS. 3A and 3B are load beam-side and flexure-side plan views, respectively, of a suspension including a load beam mounted to the DSA flexure shown in FIGS. 1A and 1B, without the piezoelectric motors.
Figure 3B:
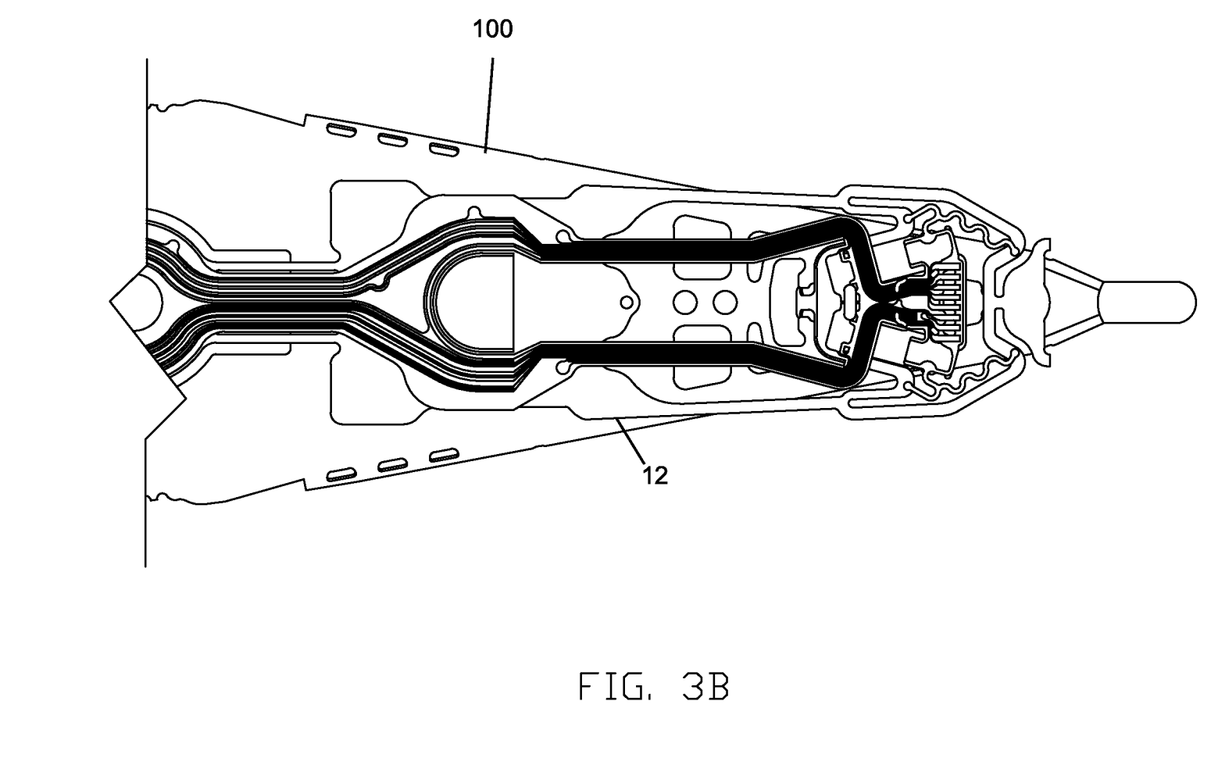

FIGS. 3A and 3B are load beam-side and flexure-side plan views, respectively, of a suspension including a load beam mounted to the DSA flexure shown in FIGS. 1A and 1B, without the piezoelectric motors. A load beam 100 is mounted to the flexure 12. For various embodiments, a load beam 100 is mounted to the flexure using welds at the base region 16 of the spring metal layer 14. The load beam 100 includes motor openings 102, 104, according to an embodiment, at least as large as the motor openings 80, 82 of the flexure 12 and the flexure motors 40 and the motor openings 102, 104 of the load beam 100 are at locations corresponding to the locations of the motor openings 80, 82 of the flexure 12 and the flexure motors 40. The motor openings 102, 104 enable the flexure motors 40 to be mounted to the flexure 12 through the load beam 100. This enables motors to be mounted during any stage of assembly of a disk drive head suspension.

Figure 4A:
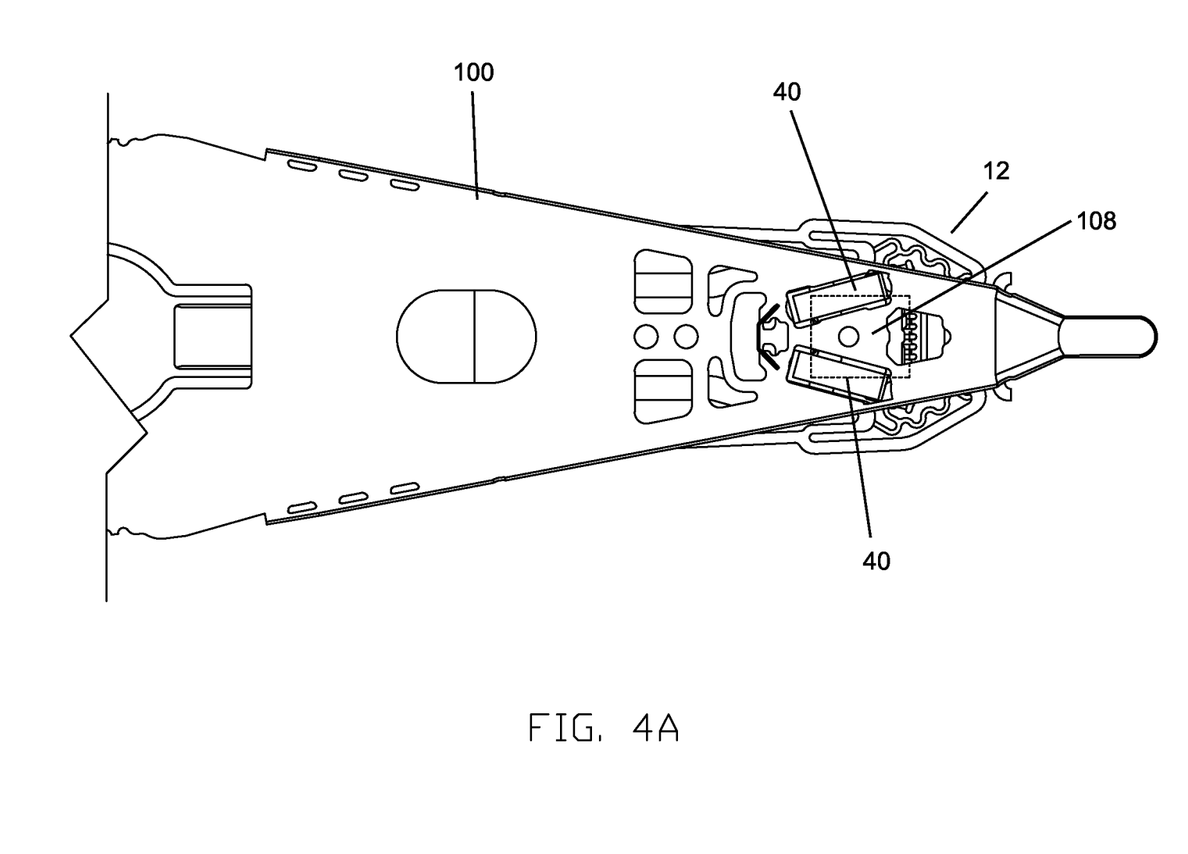
FIGS. 4A and 4B are load beam-side and flexure-side plan views, respectively, of the suspension shown in FIGS. 3A and 3B, including the piezoelectric motors.
Figure 4B:
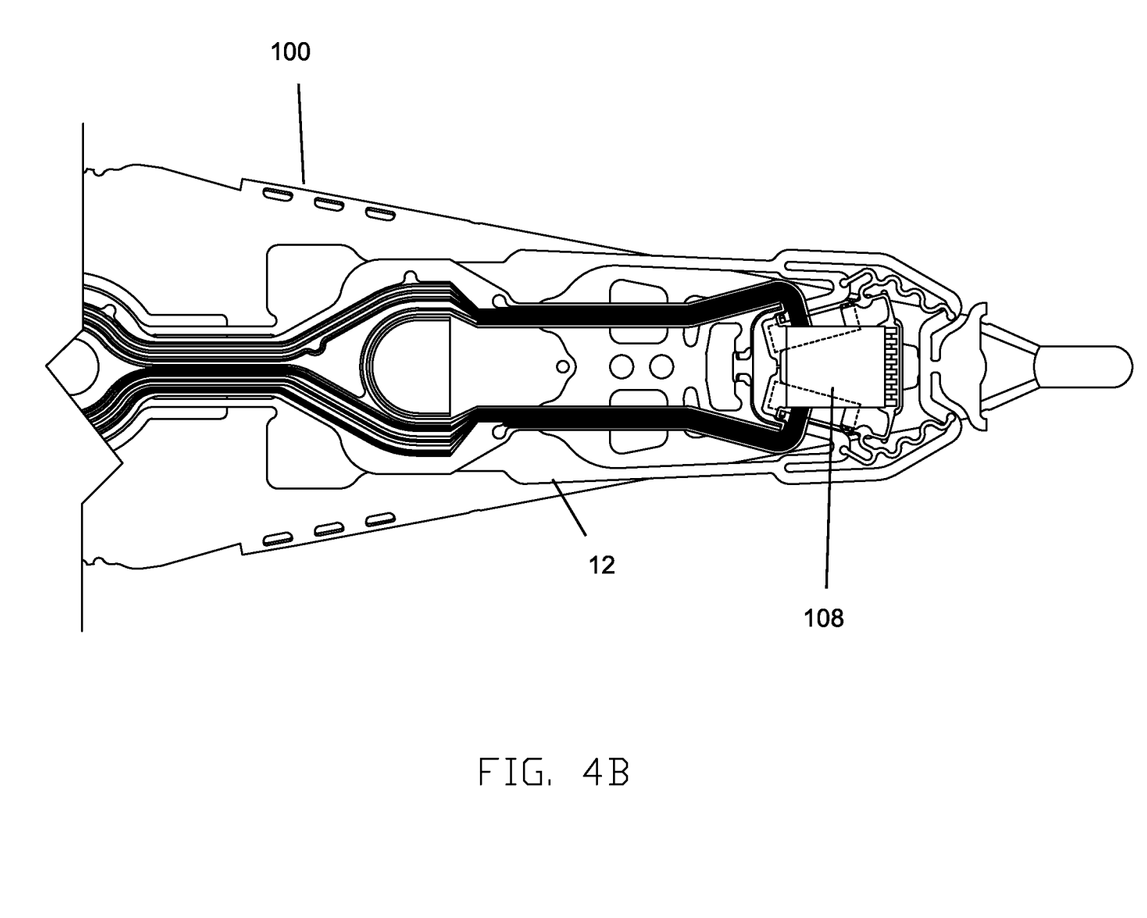

FIGS. 4A and 4B are load beam-side and flexure-side plan views, respectively, of the suspension shown in FIGS. 3A and 3B, including the piezoelectric motors. The suspension includes a slider 108 mounted (e.g., by adhesive) to the slider mounting region 20 such that at least a portion of the slider mounting portions 62 of the traces are between the spring metal layer 14 and a slider 108. For some embodiments, the slider 108 is mounted on the slider mounting region 20 and on at least a portion of the slider mounting portions 62 of the traces. The slider 108 is mounted using adhesive or using techniques known in the art.

Figure 5A:
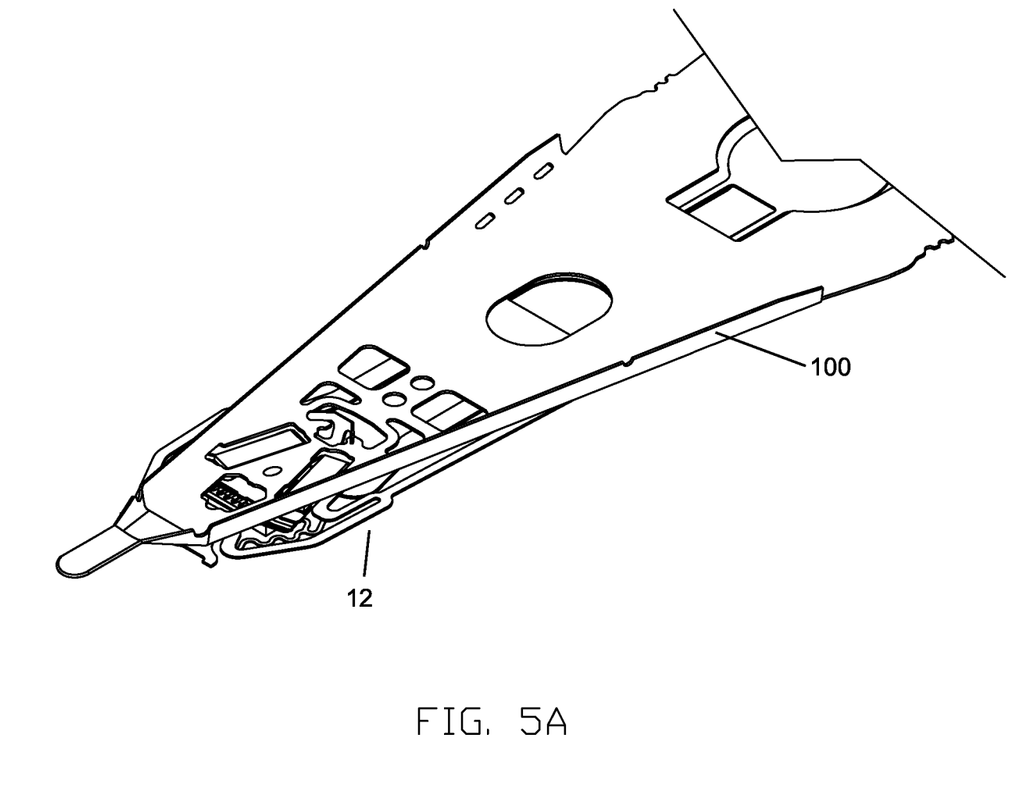
FIGS. 5A and 5B are load beam-side and flexure-side isometric views, respectively, of the suspension shown in FIGS. 4A and 4B, having head slider mounted thereto.
Figure 5B:
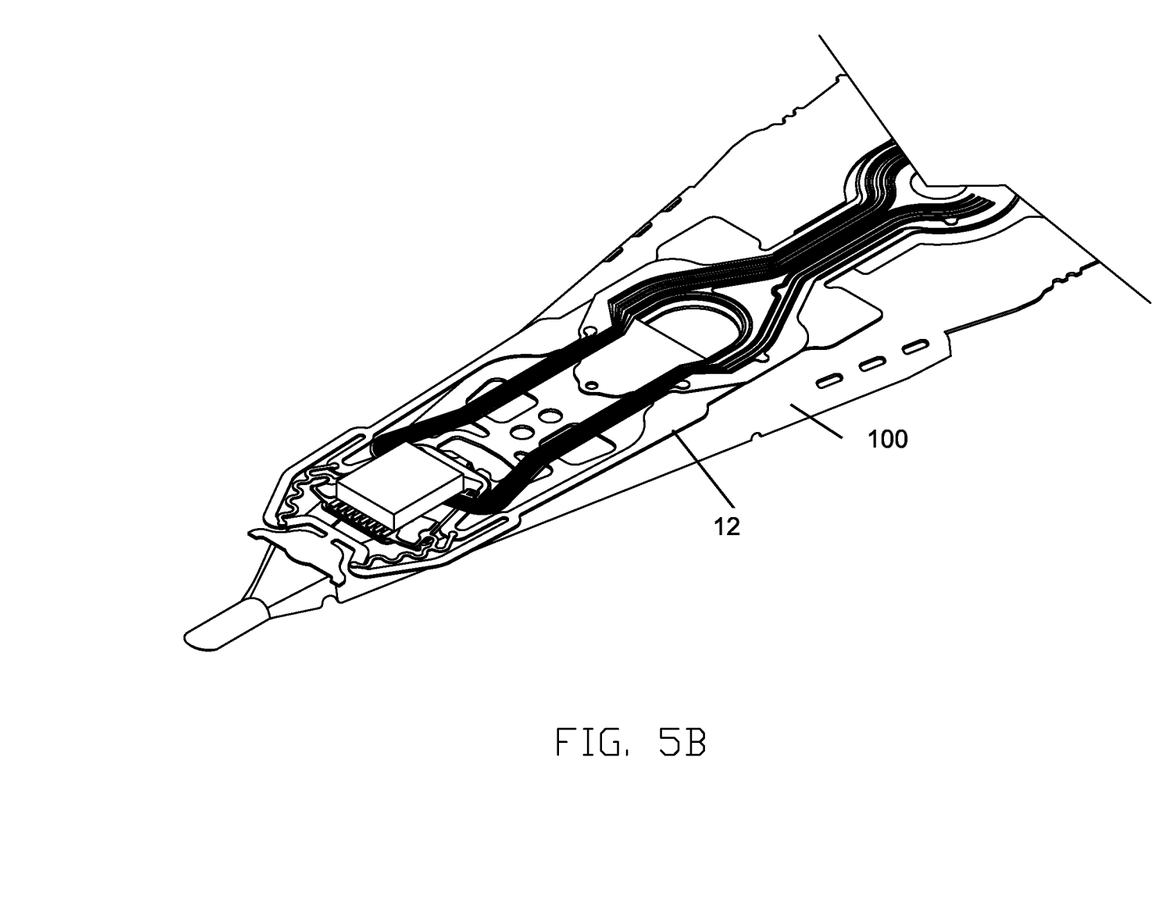

FIGS. 5A and 5B are load beam-side and flexure-side isometric views, respectively, of the suspension shown in FIGS. 4A and 4B, having head slider mounted thereto.

Figure 6A:
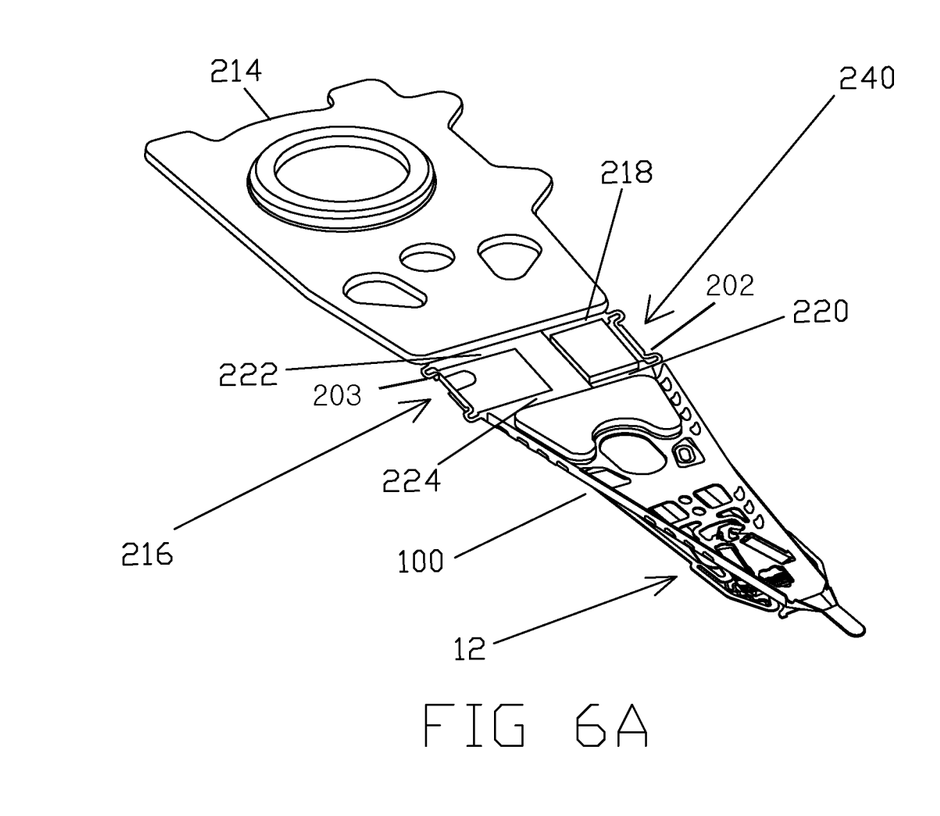
Figure 6B:
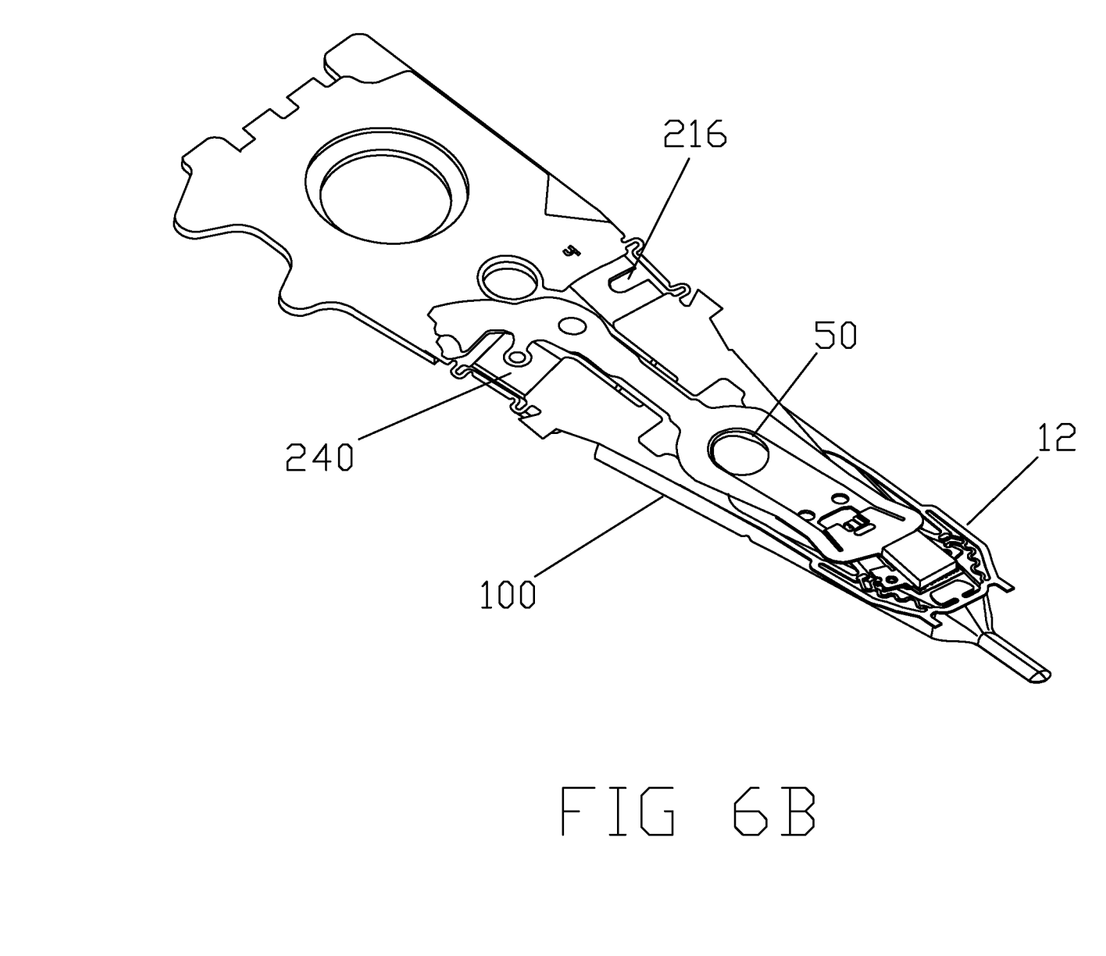

FIGS. 6A and 6B are load beam-side and flexure side isometric views, respectively, of a tri-stage actuation disk drive head suspension with non-parallel motors according to an embodiment. The tri-stage actuation disk drive head suspension includes a load beam 100, a flexure 12, a baseplate 214, and one or more baseplate motors 240 in any configuration. The load beam 100 is mounted to the baseplate 214 using mounting techniques including those described herein, such as welding. Each of the baseplate 214 and the load beam 100 can be formed from metal, such as stainless steel. According to some embodiments, the tri-stage suspension also includes a baseplate 214 having a baseplate motor 240 and a pseudo feature 216. The baseplate may also include one or more T-bar limiters 202, 203 configured to act as non-operational shock limiters and arrange to bridge the motor openings in baseplate motor 240 configured to receive either a baseplate motor 240 or a pseudo feature 216. According to some embodiments, the T-bar limiters 202, 203 and tethers 35, 37 of flexure 12 are used together on a suspension to act as non-operational shock limiters. The T-bar limiters 202, 203, according to some embodiments, are affixed to the baseplate 214 using techniques including, but not limited to, welding, adhesive, and other mounting techniques such as those known in the art. According to some embodiments, the T-bar limiters 202, 203 are formed integrally with the baseplate 214.

The baseplate 214 includes a first pair of mounting pads 218, 220 and a second pair of mounting pads 222, 224. Each pair of mounting pads are configured to receive a baseplate motor 240 and a pseudo feature 216. For various embodiments, a first pair of mounting pads 218, 220 is on an opposite side of a longitudinal axis of the baseplate 214 from the second pair of mounting pads 222, 224. The mounting pads 218, 220, 222, 224, according to some embodiments, are configured to mount a baseplate motor 240 on the same side of the suspension as the flexure motors 40. This enables the baseplate and the flexure motors to be mounted at the same stage during the manufacturing process of the suspension, which can be at any point during the assembly of a disk drive head suspension. This can minimize damage to the motors and increase manufacturing yields of the suspensions.

A baseplate motor 240 mounted to the baseplate 214 is configured to move the load beam 100. For various embodiments, baseplate motor 240 is implemented using techniques including those described herein. Pseudo feature 216, according to some embodiments, is configured to balance out the mass distribution and to the stiffness of the baseplate 214. The pseudo feature 216 may be manufactured separately and then affixed to baseplate 214. For some embodiments, pseudo feature 216 is affixed to the baseplate 214 using techniques including, but not limited to, welding, adhesive, and other mounting techniques such as those known in the art. According to some embodiments, the pseudo feature 216 is formed integrally with the baseplate 214.

Baseplate 214 and pseudo feature 216 are formed of metal, for example, from stainless steel. According to an embodiment where pseudo feature 216 is formed integrally with baseplate 214, the pseudo feature 216 may be formed using techniques including, but not limited to, etching and laser ablation to create areas of greater and lesser thickness and width within the pseudo feature 216. Furthermore, laser treatment could be used to locally alter the mechanical properties of portions of the pseudo feature 216, such as creating locally softer areas to help fine tune the properties of the pseudo feature 216. According to some embodiments, instead of a pseudo feature 216, a second baseplate motor is mounted to the baseplate 214.

A first end of baseplate motor 240 is coupled with a first terminal on a first mounting pad 218 of the baseplate 214 and a second end of baseplate motor 240 is coupled with a second terminal on a second mounting pad 220 of the baseplate 214. A conductive layer 50, similar to the conductive layers described herein, includes traces. At least a first of the traces of the conductive layer 50 terminates at a first terminal and at least a second of the traces terminates at a second terminal. As described herein the first of the traces and the second of the traces are configured to provide control signals, such as a power or ground, for the baseplate motor 240 using techniques including those described herein for other motors. For some embodiments, the first terminal provides a power signal to the baseplate motor 240 and the second terminal provides a ground. Other embodiments include the second terminal providing a power signal and the first terminal providing a ground. According to some embodiments, one of the first terminal and the second terminal is electrically coupled to the baseplate 214 to provide a ground.

Although embodiments are described in part with reference to the figures, the figures are not limiting. Other embodiments of the invention can include additional or fewer features. For example, all or portions of the traces described as being unsupported can be backed by stainless steel. As another example, the stainless steel layer can include portions (e.g., tabs) that extend from other structures (e.g., from the slider mounting region) under the proximal and/or distal ends of the motors.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A co-located, dual stage actuation disk drive head suspension flexure, comprising:
    a spring metal layer including:
        a base region having a central longitudinal flexure axis;
        laterally-spaced support arms extending distally from the base region;
        a slider mounting region having a longitudinal axis that is parallel with the central longitudinal flexure axis, including:
            a proximal portion;
            a distal portion;
            a middle portion between the proximal and distal portions;
            a load point location on the middle portion; and
            a pair of laterally spaced motor openings between the proximal and distal portions defined by edges in the spring metal layer, each motor opening on a side of the load point location opposite the other, and wherein the motor openings are configured to receive motors having longitudinal axes that are non-parallel with the longitudinal axis of the slider mounting region; and
        linkage members coupling the proximal portion of the slider mounting region to the support arms;
        a motor island in each motor opening, and wherein a first motor trace terminates at a first terminal pad on each motor island, and the first terminal pad is configured to be coupled to the motor;
    a conductor layer including at least two groups of traces, each group of traces including:
        a base portion on the base region of the spring metal layer, on a side of the flexure axis opposite the other base portion;
        a spring metal-unsupported portion extending from the base region of the spring metal layer to the slider mounting region, on a side of the flexure axis opposite the other spring metal-unsupported portion; and
        a slider mounting portion extending from the spring metal-unsupported portion onto the slider mounting region, wherein:
        one or more of the traces on the slider mounting region each terminate at a terminal pad on the slider mounting region; and
    an insulating layer between portions of the spring metal layer and the conductor layer.

2. The flexure of claim 1 and further including a slider mounted to the slider mounting region on at least portions of the slider mounting portions of the traces.

3. The flexure of claim 1 and further including a pair of motors, each having a longitudinal axis and coupled between the proximal and distal portions of the slider mounting region across one of the motor openings of the slider mounting region, wherein the longitudinal axes of the motors are non-parallel with the longitudinal axis of the slider mounting region.

4. The flexure of claim 3, wherein a distance between distal ends of the motors coupled to the distal portion of the slider mounting region is greater than a distance between proximal ends of the motors coupled to the proximal portion of the slider mounting region.

5. The flexure of claim 4, wherein at least twenty five percent of a length of each motor is located on a proximal side of the load point location and on a distal side of the load point location.

6. The flexure of claim 1 and further including a load beam mounted to the flexure, wherein the load beam includes motor openings at least as large as the motor openings of the flexure and the motors, and the motor openings of the load beam are at locations corresponding to the locations of the motor openings of the flexure and the motors.

7. The flexure of claim 1 wherein a second motor trace terminates at a second terminal pad in each motor opening, and the second terminal pad is configured to be coupled to the motor.

8. The flexure of claim 7, wherein the second terminal pad is unsupported by the spring metal layer, and the insulating layer is on the second terminal pad.

9. The flexure of claim 1 wherein the spring metal layer further includes an end portion coupled to the support arms and extending distally around the slider mounting region.

10. The flexure of claim 9 and further including one or more polymer tethers extending from the end portion to the linkage members.

11. The flexure of claim 10 wherein the polymer tethers are serpentine in shape.

12. The flexure of claim 10 wherein the polymer tethers are part of a cover coat layer of polymer.

13. The flexure of claim 1 and further including one or more polymer tethers extending from an end portion to the motor islands.

14. The flexure of claim 1, wherein the traces of the slider mounting portion are at an angle between eighty degrees and one-hundred degrees with respect to the longitudinal axes of the motor openings or motors.

15. The flexure of claim 14, wherein the angle is ninety degrees.

16. The flexure of claim 1, wherein an angle between the axis of the slider mounting region and the longitudinal axes of the motors is five-forty degrees.

17. The flexure of claim 1, wherein the spring metal-unsupported portion includes linear portions defining an interior angle.

18. The flexure of claim 17, wherein at least some or all of any non-linear portions define the interior angle that is greater than one-hundred and thirty five degrees.

19. The flexure of claim 17, wherein at least some or all of any non-linear portions define the interior angle that is greater than one-hundred and sixty degrees.

20. The flexure of claim 1, wherein one or more of the traces on the slider mounting region extend onto the middle portion of the slider mounting region.

21. The flexure of claim 20, wherein one or more of the traces on the slider mounting region extend onto the middle portion of the slider mounting region and terminate at a terminal pad on the distal portion of the slider mounting region.

22. The flexure of claim 1, wherein at least one of the traces is a motor power trace that terminates at a terminal pad configured to be coupled to the motor at the distal portion of the slider mounting region.

23. The flexure of claim 1, wherein at least one of the traces is a ground trace that terminates at a terminal pad configured to be coupled to the motor at the proximal portion of the slider mounting region.

24. The flexure of claim 1, wherein a portion of the insulating layer is on at least portions of the spring metal-unsupported portions of the conductor layer.

25. The flexure of claim 1, wherein the motor islands and first terminal pads are adjacent the distal portion of the slider mounting region.

26. The flexure of claim 25, wherein conductive adhesive mechanically and electrically couples the motor to the first terminal pad.

* * * * *